United States Patent
Chen et al.

(10) Patent No.: US 12,153,506 B2
(45) Date of Patent: Nov. 26, 2024

(54) POWER CONSUMPTION MONITORING DEVICE AND METHOD

(71) Applicants: Inventec (Pudong) Technology Corporation, Shanghai (CN); INVENTEC CORPORATION, Taipei (TW)

(72) Inventors: Wei-Chao Chen, Taipei (TW); Ming-Chi Chang, Taipei (TW); Chih-Pin Wei, Taipei (TW); Ke-Li Wu, Taipei (TW); Hua-Hsiu Chiang, Taipei (TW); Yu-Lun Chang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 161 days.

(21) Appl. No.: 18/068,526

(22) Filed: Dec. 20, 2022

(65) Prior Publication Data

US 2024/0087057 A1 Mar. 14, 2024

(30) Foreign Application Priority Data

Sep. 14, 2022 (CN) .......................... 202211116950.1

(51) Int. Cl.
*G06F 11/30* (2006.01)
*G06F 11/32* (2006.01)
(Continued)

(52) U.S. Cl.
CPC ...... *G06F 11/3062* (2013.01); *G06F 11/3068* (2013.01); *G06F 11/327* (2013.01);
(Continued)

(58) Field of Classification Search
CPC .. G06Q 50/06; H02J 13/00002; G06F 1/3203; G06F 1/3206; G06F 11/3006;
(Continued)

(56) References Cited

U.S. PATENT DOCUMENTS

2009/0322150 A1* 12/2009 Cline ...................... G06F 1/206
  307/35
2010/0274766 A1* 10/2010 Nagashima ........... G06F 3/0625
  711/E12.001
(Continued)

FOREIGN PATENT DOCUMENTS

JP           2012235548 A  * 11/2012

*Primary Examiner* — Thomas J. Cleary
(74) *Attorney, Agent, or Firm* — CKC & Partners Co., LLC (57) ABSTRACT

A power consumption monitoring device includes a sensor, a storage, and a processor. The sensor is configured to detect a power-consuming device quantity and a power consumption amount. The storage is configured to store the power-consuming device quantity and the power consumption amount. The processor is communicatively connected to the sensor and the storage. The processor is configured to calculate a power-consuming device idling indicator based on the power-consuming device quantity and the power consumption amount in a monitoring time interval, wherein the power-consuming device idling indicator is used for indicating a deviation status of the power-consuming device quantity and the power consumption amount. The processor is further configured to determine whether the power-consuming device idling indicator exceeds a warning threshold. In response to the power-consuming device idling indicator exceeding the warning threshold, the processor is further configured to generate a warning message.

9 Claims, 3 Drawing Sheets

(51) Int. Cl.
*G06Q 50/06* (2024.01)
*H02J 13/00* (2006.01)

(52) U.S. Cl.
CPC ........ *G06Q 50/06* (2013.01); *H02J 13/00002* (2020.01); *Y02D 10/00* (2018.01)

(58) Field of Classification Search
CPC ............. G06F 11/3062; G06F 11/3065; G06F 11/3068; G06F 11/324; G06F 11/327; Y02D 10/00
See application file for complete search history.

(56) References Cited

U.S. PATENT DOCUMENTS

| | | | |
|---|---|---|---|
| 2012/0084551 A1* | 4/2012 | Cheng ..................... | G06F 1/206 |
| | | | 713/300 |
| 2013/0013949 A1* | 1/2013 | Mohammed .............. | G06F 1/26 |
| | | | 713/340 |
| 2019/0334731 A1* | 10/2019 | Li ........................... | H04L 12/10 |
| 2022/0216792 A1* | 7/2022 | Shkoury ............. | H02M 3/1582 |
| 2023/0239211 A1* | 7/2023 | Palmero ............. | H04L 41/0833 |

* cited by examiner

POWER CONSUMPTION MONITORING DEVICE AND METHOD

CROSS-REFERENCE TO RELATED APPLICATION

This application claims priority to China Application Serial Number 202211116950.1, filed Sep. 14, 2022, which is herein incorporated by reference in its entirety.

BACKGROUND

Field of Invention

The present invention relates to monitoring device and method. More particularly, the present invention relates to power consumption monitoring device and method.

Description of Related Art

In the process of developing electronic products, the product testing department would test new products by test computers in the testing phase, e.g., parts compatibility test. By a batch of new product be tested, the number of occupied test computers increases, and so that the power consumption rises. However, by the batch of new products completes the tests, the number of idle test computers increases, and so that the power consumption falls. In the meantime, if the idle test computers are not shut down, it would lead to waste of energy.

Accordingly, there is an urgent need for a technology that can monitor the number of idle devices and reduce the waste of energy.

SUMMARY

The present disclosure provides a power consumption monitoring device includes a sensor, a storage, and a processor. The sensor is configured to detect a power-consuming device quantity and a power consumption amount. The storage is configured to store the power-consuming device quantity and the power consumption amount. The processor is communicatively connected to the sensor and the storage. The processor is configured to calculate a power-consuming device idling indicator based on the power-consuming device quantity and the power consumption amount in a monitoring time interval, wherein the power-consuming device idling indicator is used for indicating a deviation status of the power-consuming device quantity and the power consumption amount. The processor is further configured to determine whether the power-consuming device idling indicator exceeds a warning threshold. In response to the power-consuming device idling indicator exceeding the warning threshold, the processor is further configured to generate a warning message.

The present disclosure further provides a power consumption monitoring method suitable for an electronic device. The power consumption monitoring method includes following steps. A power-consuming device quantity and a power consumption amount are detected. A power-consuming device idling indicator is calculated based on the power-consuming device quantity and the power consumption amount in a monitoring time interval, wherein the power-consuming device idling indicator is used for indicating a deviation status of the power-consuming device quantity and the power consumption amount. Whether the power-consuming device idling indicator exceeds a warning threshold is determined. In response to the power-consuming device idling indicator exceeding the warning threshold, a warning message is generated.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
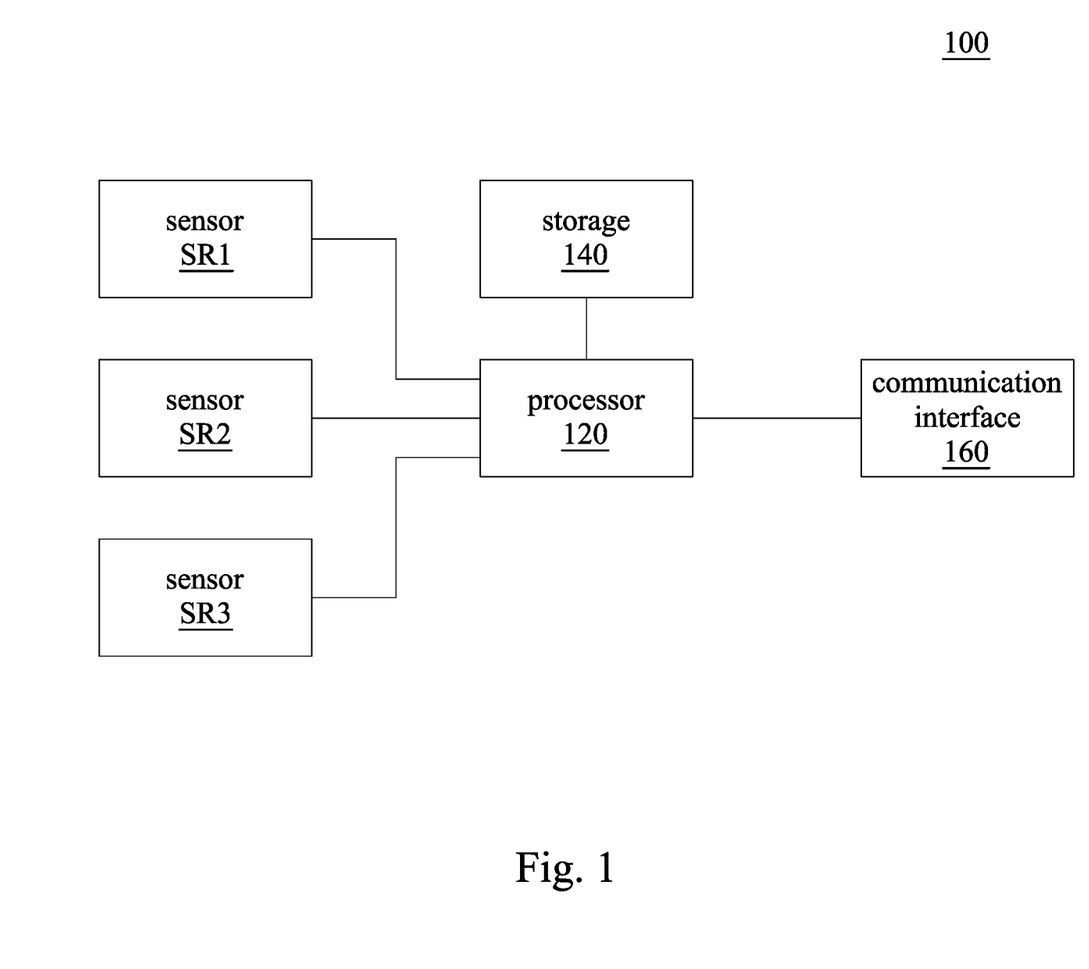
FIG. 1 is a block diagram illustrating a power consumption monitoring device according to some embodiments of the present disclosure.

Reference is made to FIG. 1. FIG. 1 is a block diagram illustrating a power consumption monitoring device 100 according to some embodiments of the present disclosure. The power consumption monitoring device 100 includes a processor 120, a storage 140, a communication interface 160, and a plurality of sensors SR1, SR2, and SR3. The storage 140, a communication interface 160, and a plurality of sensors SR1, SR2, and SR3 are communicatively connected to the processor 120 separately. In some embodiments, the power consumption monitoring device 100 operates in a laboratory of an electronic device testing department, and used for monitoring a power-consuming state of the test computers in the laboratory. If there are several test computers complete the test, but still consume power with an operational state, the power consumption monitoring device 100 warns staffs of the laboratory to check the test computers and shut the test computers which complete the test down, in order to reduce the power consumption.

The plurality of sensors SR1, SR2, and SR3 is configured to detect a power-consuming device quantity and a power consumption amount. In some embodiments, the plurality of sensors SR1, SR2, and SR3 can include counters of electric-consuming device and wattmeters. The counters of electric-consuming device is configured to obtain the power-consuming device quantity by calculating the number of conducted plugs in the laboratory, calculating the number of parallel circuits in a power grid, and/or other means for calculating the number of electric-consuming devices in the power grid. The wattmeters are configured to obtain the power consumption amount by integrating electric power detected in a monitoring time interval. In some embodiments, the monitoring time interval is 1 day; correspondingly, the power-consuming device quantity is calculated in a cycle which is a day. For example, the power-consuming device quantity corresponds to a day is calculated by calculating the average of three numbers of electric-consuming device obtained within the day. In some embodiments, the power consumption monitoring device 100 includes more or less sensors as needed.

After generating the power-consuming device quantity and the power consumption amount, the plurality of sensors SR1, SR2, and SR3 send the power-consuming device quantity and the power consumption amount to the storage 140. The storage 140 is configured to store the power-consuming device quantity and the power consumption amount. The storage 140 can include a magnetic disk, a hard drive, and/or other non-transitory memory.

The processor 120 is configured to calculate, determine, and generate a warning message. In some embodiments, the processor 120 includes a central processing unit (CPU), a multiple server, a distributed processing system (DPS), an application specific integrated circuit (ASIC), and/or other suitable process unit.

The communication interface 160 allows the power consumption monitoring device 100 communicate with other device. The communication interface 160 can include: wireless network interfaces such as BLUETOOTH or WIFI; or wired network interfaces such as ETHERNET or USB.

Figure 2:
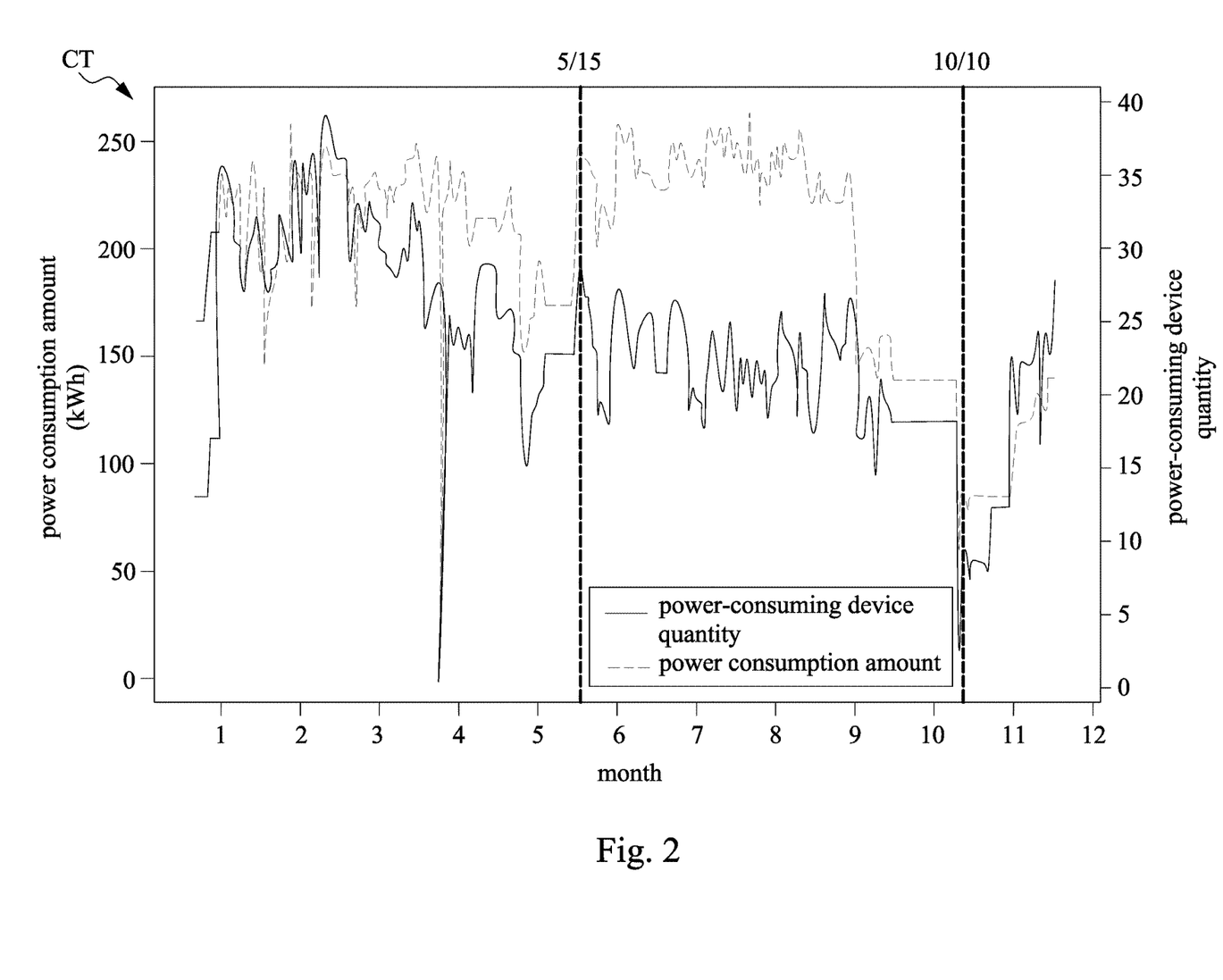
FIG. 2 is a line chart diagram illustrating power-consuming device quantities and power consumption amounts according to some embodiments of the present disclosure.

Reference is made to FIG. 2. FIG. 2 is a line chart diagram illustrating daily power-consuming device quantities and daily power consumption amounts within a year according to some embodiments of the present disclosure. The power-consuming device quantities and the power consumption amounts are roughly overlapped, except for there is a significant gap between the power-consuming device quantities and the power consumption amounts from May 15 to October 10. The power consumption amounts from May 15 to October 10 did not rise with the increasing of the power-consuming device quantities, instead, the power consumption amounts remain relatively low values.

In some embodiments, the situation (during May 15 to October 10) described above is due to the test computers in the power grid complete the test and enter a standby mode, in the meantime, the power consumption amount falls. However, the test computers in the standby mode still consume power, even the power consumption amount is not as much as the power consumption amount during performing the test. Thus, the power-consuming device quantities remain relatively higher values, and the power consumption amounts fall when the test computers enter the standby mode as illustrated in FIG. 2 with the significant gap between the power-consuming device quantities and the power consumption amounts.

As mentioned above, the processor 120 is configured to calculate and determine whether there are a certain number of idling power-consuming devices according to the power-consuming device quantities and the power consumption amounts, and further generate a warning message.

First, in the embodiments of the present disclosure, the processor 120 calculates a power-consuming device idling indicator based on the power-consuming device quantity and the power consumption amount in a monitoring time interval, wherein the power-consuming device idling indicator is used for indicating a deviation status of the power-consuming device quantity and the power consumption amount. In an embodiment, the processor 120 obtains the power-consuming device quantity and the power consumption amount correspond to the monitoring time interval, and calculates the power-consuming device idling indicator by dividing or subtracting the power-consuming device quantity and the power consumption amount. By the calculation, the power-consuming device idling indicator is used for representing a value relation between the power-consuming device quantity and the power consumption amount in the same time interval (i.e., the monitoring time interval). In an embodiment, the processor 120 divides a number of test computers in an operational state in the laboratory (i.e., the power-consuming device quantity) by a daily power consumption of the test computers in the laboratory (i.e., the power consumption amount) to generate the power-consuming device idling indicator.

Next, in the embodiments of the present disclosure, the processor 120 determines whether the power-consuming device idling indicator exceeds a warning threshold. The warning threshold can be generated by the processor 120 or input by a user (e.g., staffs of the laboratory or power data analyst). In the embodiments mentioned above, the user set the warning threshold as 0.2, and if the power-consuming device idling indicator exceeds 0.2, the processor 120 determines the power-consuming device idling indicator exceeds the warning threshold.

Then, in the embodiments of the present disclosure, in response to the power-consuming device idling indicator exceeding the warning threshold, the processor 120 generates a warning message. According to the embodiments mentioned above, when the power-consuming device idling indicator exceeds 0.2, the processor 120 generates the warning message to warn the user. In some embodiments, the warning message includes a monitoring range, the power-consuming device quantity, and the power consumption amount. The processor 120 further sends the warning message to the user through the communication interface 160 by a display screen, an email, a text message, a communication software, and/or other communication means.

In some embodiments, the processor 120 further transforms the power-consuming device quantity and the power consumption amount, and generates a first power-consuming device quantity and a first power consumption amount based on a first standardization rule, wherein the first power-consuming device quantity and the first power consumption amount correspond to a same unit of measurement.

It should be noted that, due to the power-consuming device quantity and the power consumption amount do not correspond to the same scale or the same unit of measurement, therefore, the processor 120 transforms the power-consuming device quantity and the power consumption amount based on the first standardization rule, and generates the first power-consuming device quantity and the first power consumption amount in order to perform calculation and comparison with the first power-consuming device quantity and the first power consumption amount correspond to the same unit of measurement.

Further, after generating the first power-consuming device quantity and the first power consumption amount, the processor 120 calculates the power-consuming device idling indicator based on the first power-consuming device quantity and the first power consumption amount.

In an embodiment, the first standardization rule uses Z-score standardization in the transformation. More particularly, the power-consuming device quantity and the power consumption amount are transformed according to the following formula:

$$Z = \frac{X - \mu}{\sigma}, \qquad \text{(formula 1)}$$

in which if X is the power-consuming device quantity, Z is the transformed first power-consuming device quantity, μ is an arithmetic mean of the power-consuming device quantity (i.e., X), and σ is a standard deviation of the power-consuming device quantity (i.e., X). Correspondingly, if X is the power consumption amount, Z is the transformed first the power consumption amount, μ is an arithmetic mean of the power consumption amount (i.e., X), and σ is a standard deviation of the power consumption amount (i.e., X).

According to the formula 1 mentioned above, the power-consuming device quantity and/or the power consumption amount can be transformed into the first power-consuming device quantity and/or the first the power consumption amount, and the first power-consuming device quantity and the first the power consumption amount can be calculated or compared in the same unit of measurement.

Further, the processor 120 can generate the power-consuming device idling indicator by dividing the power-consuming device quantity by the power consumption amount and/or subtracting the power-consuming device quantity by the power consumption amount.

Also, in other embodiments, the first standardization rule uses min-max normalization in the transformation. More particularly, the power-consuming device quantity and the power consumption amount are transformed according to the following formula:

$$Xnom = \frac{(X - Xmin)}{(Xmax - Xmin)}, \qquad \text{(formula 2)}$$

in which if X is the power-consuming device quantity, Xnom is the transformed first power-consuming device quantity, Xmin is a minimum power-consuming device quantity, and Xmax is a maximum power-consuming device quantity. Correspondingly, if X is the power consumption amount, Xnom is the transformed first power consumption amount, Xmin is a minimum power consumption amount, and Xmax is a maximum power consumption amount.

It should be noted that, the minimum power-consuming device quantity can be the power-consuming device quantity of the laboratory at minimum capacity, a minimum value of the power-consuming device quantities obtained in the past, and/or other minimum value of the power-consuming device quantity determined according to the context-applied. Similarly, the minimum power consumption amount can be the power consumption amount of the laboratory at minimum capacity, a minimum value of the power consumption amounts obtained in the past, and/or other minimum value of the power consumption amount determined according to the context-applied.

Also, the maximum power-consuming device quantity can be the power-consuming device quantity of the laboratory in which all of the test computers are performing tests, a maximum value of the power-consuming device quantities obtained in the past, and/or other maximum value of the power-consuming device quantity determined according to the context-applied. Similarly, the maximum power consumption amount can be the power consumption amount of the laboratory at maximum capacity, a maximum value of the power consumption amounts obtained in the past, and/or other maximum value of the power consumption amount determined according to the context-applied.

According to the formula 2 mentioned above, the power-consuming device quantity and/or the power consumption amount can be transformed into the first power-consuming device quantity and/or the first the power consumption amount, and the first power-consuming device quantity and the first the power consumption amount can be calculated or compared in the same unit of measurement.

Further, the processor 120 can generate the power-consuming device idling indicator by dividing the power-consuming device quantity by the power consumption amount and/or subtracting the power-consuming device quantity by the power consumption amount.

Besides, in another embodiment, the first standardization rule uses extreme value transformation in the transformation. More particularly, the power-consuming device quantity is transformed according to the following formula:

$$Xmax = \mu \cdot Xunit, \qquad \text{(formula 3)},$$

in which Xunit is the power-consuming device quantity, Xmax is a maximum power consumption amount, and μ is a maximum power consumption amount of a single power-consuming device.

It should be noted that, if all of the test computers in the laboratory have the same specification, the maximum power consumption amount of a single power-consuming device can be a product of maximum electric power of the specification of the test computers and the monitoring time interval.

On the other hand, if there are test computers with different specifications in the laboratory, the maximum power consumption amount (i.e., Xmax) can be calculated according to the following formula:

$$Xmax = \mu_1 \cdot Xunit_1 + \mu_2 \cdot Xunit_2 + \ldots + \mu_n \cdot Xunit_n, \qquad \text{(formula 4)},$$

in which $Xunit_1$, $Xunit_2$, and $Xunit_n$ are the power-consuming device quantity of the test computers with different specifications, and $\mu_1$, $\mu_2$, and $\mu_n$ are the maximum power consumption amount of a single power-consuming device corresponding to the different specifications.

According to the formula 3 and the formula 4 mentioned above, the power-consuming device quantity is transformed into the maximum power consumption amount. Therefore, the maximum power consumption amount can be calculated or compared with the power consumption amount in the same unit of measurement. In an embodiment, the power-consuming device idling indicator can be a ratio calculated by dividing the maximum power consumption amount (i.e., Xmax) by the power consumption amount.

Also, the power consumption amount can be transformed according to the following formula:

$$Xmin = \frac{Xele}{\mu}, \qquad \text{(formula 5)}$$

In which Xele is the power consumption amount, Xmin is a minimum power-consuming device quantity, and μ is a maximum power consumption amount of a single power-consuming device, wherein the maximum power consumption amount of a single power-consuming device can be calculated by the same method with the maximum power consumption amount of a single power-consuming device in formula 3.

According to the formula 5 mentioned above, the power consumption amount is transformed into the minimum power-consuming device quantity. Therefore, the minimum power-consuming device quantity can be calculated or compared with the power-consuming device quantity in the same unit of measurement. In an embodiment, the power-consuming device idling indicator can be a ratio calculated by dividing the power-consuming device quantity by the minimum power-consuming device quantity (i.e., Xmin).

Based on the above-mentioned first standardization rule, the processor 120 can transform the power-consuming device quantity and the power consumption amount into the first power-consuming device quantity and the first power consumption amount correspond to a same unit of measurement, and calculate the power-consuming device idling indicator.

In some embodiments, the processor 120 further calculates a plurality of history power-consuming device idling indicators correspond to each of a plurality of history time intervals based on a plurality of history power-consuming device quantities and a plurality of history power consumption amounts correspond to the plurality of history time intervals. In an embodiment, the processor 120 obtains the plurality of history power-consuming device quantities and the plurality of corresponding history power consumption amounts from the storage 140, and calculates the plurality of history power-consuming device idling indicators by dividing or subtracting the plurality of history power-consuming device quantities and the plurality of history power consumption amounts.

Further, the processor 120 determines the warning threshold based on the plurality of history power-consuming device idling indicators.

In some embodiments, the processor 120 calculates the warning threshold based on n-standard deviation comparison. In this case, the warning threshold is set as a sum of an arithmetic mean and N times the standard deviation of the plurality of history power-consuming device idling indicators, wherein the value of N can be set by user according to the context-applied.

In some embodiments, the processor 120 calculates the warning threshold based on right-side confidence interval. The warning threshold can be calculated according to the following formula:

$$T = \mu + \frac{Z\alpha \cdot \sigma}{\sqrt{n}}, \qquad \text{(formula 6)}$$

in which T is the warning threshold, $\mu$ is an arithmetic mean of the plurality of history power-consuming device idling indicators, $Z\alpha$ is a value of Z in a significant level $\alpha$ under a standard normal distribution, $\sigma$ is a standard deviation of the plurality of history power-consuming device idling indicators, and n is a number of the plurality of history power-consuming device idling indicators, wherein $\alpha$ can be set by user according to the context-applied.

In some embodiments, the processor 120 transforms the plurality of history power-consuming device quantities and the plurality of history power consumption amounts, and generates a plurality of first history power-consuming device quantities and a plurality of first history power consumption amounts based on a second standardization rule, wherein the plurality of first history power-consuming device quantities and the plurality of first history power consumption amounts correspond to a same unit of measurement.

Further, the processor 120 calculates the plurality of history power-consuming device idling indicators based on the plurality of first history power-consuming device quantities and the plurality of first history power consumption amounts.

Same as the first standardization rule, the processor 120 transforms the plurality of history power-consuming device quantities and the plurality of history power consumption amounts, and generates the plurality of first history power-consuming device quantities and the plurality of first history power consumption amounts based on the second standardization rule, wherein the plurality of first history power-consuming device quantities and the plurality of first history power consumption amounts correspond to a same unit of measurement. It is noted that, the plurality of history power-consuming device quantities and the plurality of history power consumption amounts can be transformed based on the same standardization rule as the first standardization rule. Also, same as the embodiments mentioned above, the processor 120 calculates the plurality of history power-consuming device idling indicators based on the plurality of first history power-consuming device quantities and the plurality of first history power consumption amounts according to the above-mentioned method.

In some embodiments, the processor 120 clusters the plurality of history power-consuming device idling indicators, generates a standard group and an abnormal group, and sets the warning threshold as a minimum value of the abnormal group.

According to the technical problem of the present disclosure, in order to determine the deviation status of the power-consuming device quantity and the power consumption amount, the power-consuming device idling indicator is calculated for indicating the deviation status. By the value of the power-consuming device idling indicator, the power consumption monitoring device 100 can distinguish between a relatively lower value as a standard status (i.e., the number of idle devices does not exceed a certain value) and a relatively higher value as an abnormal status (i.e., the number of idle devices exceeds a certain value). Thus, the warning threshold is used for distinguishing the value of the power-consuming device idling indicator between a standard value which is lower than the warning threshold and an abnormal value which is higher than the warning threshold.

In other words, if the power-consuming device idling indicators obtained in the past (i.e., the plurality of history power-consuming device idling indicators) are clustered into a group of standard status indicators with relatively lower values and a group of abnormal status indicators with relatively higher values, and then the warning threshold can be set as a boundary of the two groups, namely, a maximum value of the standard status indicators or a minimum value of the abnormal status indicators.

Thus, in the embodiments of the present disclosure, the processor 120 clusters the plurality of history power-consuming device idling indicators into a standard group with relatively lower values and an abnormal group with relatively higher values.

In an embodiment, the processor 120 clusters the plurality of history power-consuming device idling indicators into two groups by K-means clustering, wherein the group with relatively lower values is the standard group, and the group with relatively higher values is the abnormal group. Further, the warning threshold is set as one of the plurality of history power-consuming device idling indicators which has a minimum value in the abnormal group.

It is noted that, in other embodiments, the processor 120 can cluster the plurality of history power-consuming device idling indicators by any other clustering algorithm, and set the warning threshold as a minimum value of the abnormal group.

In some embodiments, the processor 120 calculates a distribution of the plurality of history power-consuming device idling indicators in a time interval; generates an adjustment data based on the distribution of the plurality of history power-consuming device idling indicators in the time interval; and determines the warning threshold based on the adjustment data.

Owing to the distribution of the plurality of history power-consuming device idling indicators may have periodic features. For example, the laboratory receives a batch of new products and performs tests, the usage rate of the test computers and the power consumption rise, however, by the batch of new products completes the tests, the usage rate of the test computers and the power consumption fall. With different usage rates of the test computers, a single warning threshold may not suitable for different circumstances. For example, when the usage rate of the test computers and the power consumption is high and the power-consuming device idling indicator is lower than the warning threshold, but there may still exists a certain number of the idle devices. Therefore, the power consumption monitoring device 100 dynamically adjusts the threshold according to the periodic features of the distribution of the plurality of history power-consuming device idling indicators to solve the above-mentioned problem.

In an embodiment, the processor 120 transforms the distribution of the plurality of history power-consuming device idling indicators in the time interval (e.g., 3 years) (i.e., a time domain data) into a plurality of frequency spectrum data (i.e., a frequency domain data), generates a plurality of value of the plurality of frequency spectrum data, and sets the adjustment data as a period corresponds to a maximum value of the plurality of value of the plurality of frequency spectrum data.

In an embodiment, the processor 120 fits parameters of the seasonal autoregressive integrated moving average model (SARIMA model) according to the distribution of the plurality of history power-consuming device idling indicators in the time interval (e.g., 3 years), further obtains a period parameter which is the best fit of the SARIMA model according to Akaike information criterion (AIC) or Bayesian information criterion (BIC), and sets the adjustment data as a period corresponds to the period parameter.

According to the embodiments mentioned above, the power consumption monitoring device 100 can obtain the periodic features of the distribution of the plurality of history power-consuming device idling indicators in the time interval. Further, the power consumption monitoring device 100 generates an adjustment data based on the distribution of the plurality of history power-consuming device idling indicators in the time interval, and determines the warning threshold based on the adjustment data.

For example, it is assumed that the period is 1 year, and the warning threshold corresponds to the power-consuming device idling indicator on Jun. 23, 2022 is calculated by the processor 120. In an embodiment, first, the processor 120 obtains the corresponding history power-consuming device idling indicators according to the time interval. For example, if the time interval is 3 years, the processor 120 obtains the history power-consuming device idling indicators in the same time (i.e., June 23) as the power-consuming device idling indicator in the past 3 years, namely, the history power-consuming device idling indicators on Jun. 23, 2021, Jun. 23, 2020, and Jun. 23, 2019. Next, the processor 120 calculates the warning threshold according to the three history power-consuming device idling indicators by using the above-mentioned method for calculating the warning threshold.

In some embodiments, the time interval can be set by the user according to the context-applied. For example, the devices in the laboratory have updated 2 years ago, so the time interval can be set as 2 years. The time interval can also be set according to the periodic features of the distribution of the plurality of history power-consuming device idling indicators. For example, the time interval can be set as 3 years if only the plurality of history power-consuming device idling indicators in the past 3 years have a periodic features.

In some embodiments, the adjustment data includes an adjustment time interval and an adjustment cycle. The processor 120 calculates at least one first history power-consuming device idling indicator corresponds to the adjustment time interval based on the adjustment cycle, and calculates an updated warning threshold for updating the warning threshold based on the at least one first history power-consuming device idling indicator.

In an embodiment, first, the processor 120 can obtain the plurality of history power-consuming device idling indicators in the same time as the power-consuming device idling indicator according to the adjustment time interval. For example, it is assumed that the adjustment time interval is 5 days, and the updated warning threshold corresponds to the power-consuming device idling indicator on Jun. 23, 2022 is calculated by the processor 120. The processor 120 obtains the plurality of history power-consuming device idling indicators in the same time (i.e., June 23) as the power-consuming device idling indicator with the adjustment time interval in the past 3 years, namely, the plurality of history power-consuming device idling indicators on June 18 to Jun. 28, 2021, June 18 to Jun. 28, 2020, and June 18 to Jun. 28, 2019. Next, the processor 120 calculates the updated warning threshold according to the plurality of history power-consuming device idling indicators.

According to the embodiments mentioned above, the power consumption monitoring device 100 can generate the adjustment data according to the periodic features of the distribution of the plurality of history power-consuming device idling indicators, wherein the adjustment time interval is 5 days, and the adjustment cycle is 1 year, and then the power consumption monitoring device 100 determines the updated warning threshold based on the adjustment data.

In some embodiments, the processor 120 clusters the plurality of history power-consuming device idling indicators, generates at least one first warning threshold based on at least one clustering algorithm, wherein each of the at least one clustering algorithm corresponds to a weight, and determines the warning threshold based on the at least one weight and the at least one first warning threshold.

Owing to there is a potential of overfitting if the processor 120 clusters the plurality of history power-consuming device idling indicators and generates the warning threshold based on a single model, algorithm, or calculation method. In the embodiments, the processor 120 clusters the plurality of history power-consuming device idling indicators and generates the at least one first warning threshold according to above-mentioned at least one model, algorithm, or calculation method by which the plurality of history power-consuming device idling indicators are clustered and the warning threshold is generated.

Further, the processor 120 can generate at least one weight corresponding to the at least one clustering algorithm by a uniform set (i.e., every model, algorithm, or calculation method corresponds to a same weight), a linear set, or a non-linear set.

Finally, the processor 120 calculates the warning threshold according to the at least one first warning threshold based on the at least one weight.

According to the embodiments mentioned above, the power consumption monitoring device 100 calculates a power-consuming device idling indicator according to the power-consuming device quantity and the power consumption amount, and generates a warning message in response to the power-consuming device idling indicator exceeds a warning threshold. Thus, the power consumption monitoring device 100 can remind user to check and shut the unnecessary device down if there are a certain number of idle devices draining power in a monitoring area of the power consumption monitoring device 100.

Also, the power consumption monitoring device 100 can calculate a plurality of history power-consuming device idling indicators according to the plurality of power-consuming device quantities and the plurality of power consumption amounts obtained in the past, and calculate the warning threshold according to the plurality of history power-consuming device idling indicators.

Also, the power consumption monitoring device 100 can generate an adjustment data by calculating a distribution of the plurality of history power-consuming device idling indicators in a time interval to calculate the warning threshold. Accordingly, the power consumption monitoring device 100 can generate a warning threshold with higher precision by using periodic features of the distribution of the plurality of history power-consuming device idling indicators.

Figure 3:
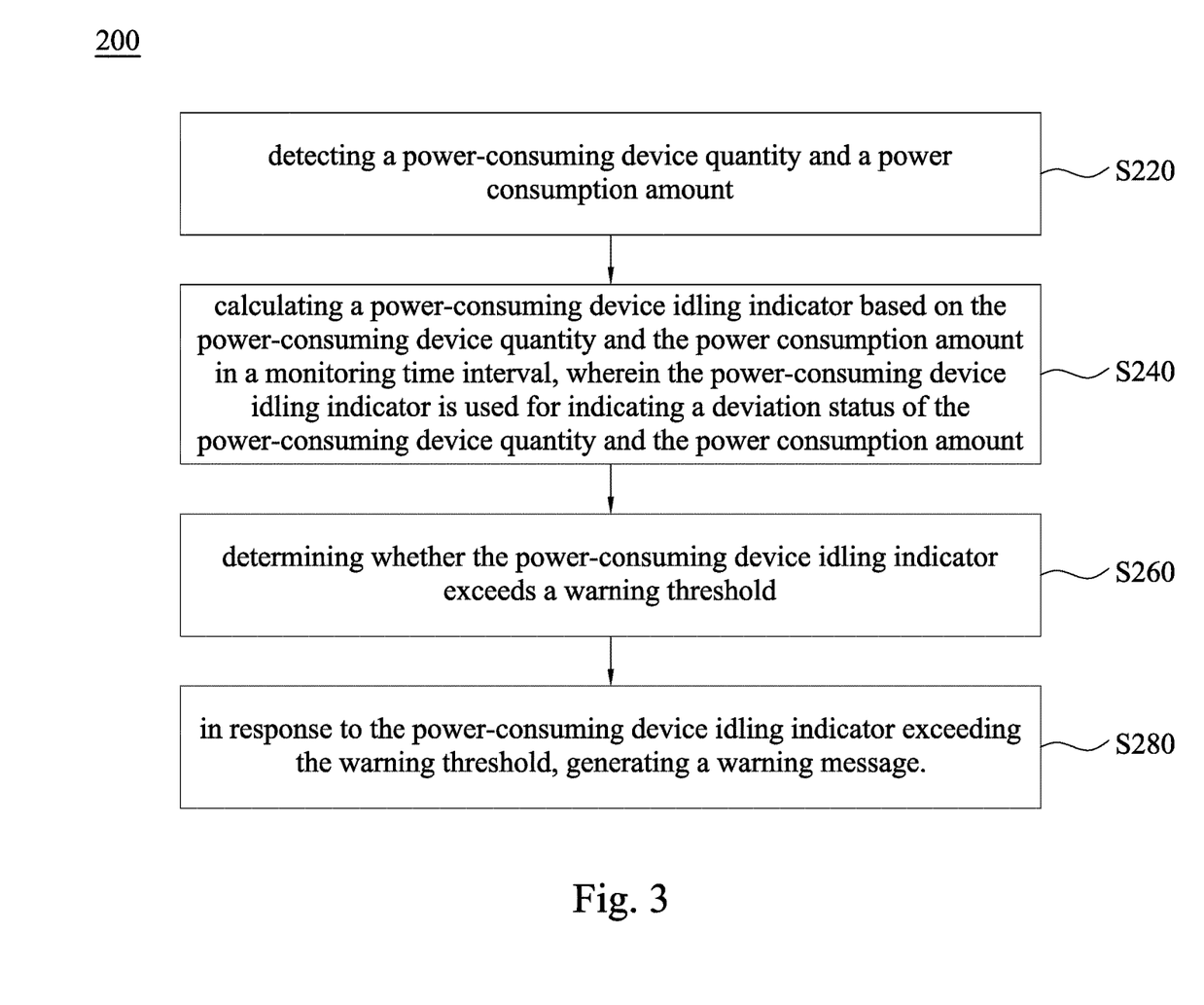
FIG. 3 is a flow diagram illustrating a power consumption monitoring method according to some embodiments of the present disclosure.

Another embodiment of the present disclosure is a power consumption monitoring method and a flowchart thereof is depicted in FIG. 3. The power consumption monitoring method 200 is adapted for use in an electronic device (e.g., the power consumption monitoring device 100 of the above-mentioned embodiment). The electronic device includes a sensor, a storage, and a processor (e.g., the sensors SR1, SR2, and SR3, storage 140, and processor 120 of the above-mentioned embodiment). The power consumption monitoring method 200 is performed by the electronic device. The power consumption monitoring method 200 generates a warning message through steps S220 to S280.

In the step S220, the electronic device detects a power-consuming device quantity and a power consumption amount. In the step S240, the electronic device calculates a power-consuming device idling indicator based on the power-consuming device quantity and the power consumption amount in a monitoring time interval, wherein the power-consuming device idling indicator is used for indicating a deviation status of the power-consuming device quantity and the power consumption amount. Next, in the step S260, the electronic device determines whether the power-consuming device idling indicator exceeds a warning threshold. Finally, in the step S280, in response to the power-consuming device idling indicator exceeding the warning threshold, the electronic device generates a warning message.

In some embodiments, the power consumption monitoring method 200 further comprises following steps: transforming the power-consuming device quantity and the power consumption amount, and generating a first power-consuming device quantity and a first power consumption amount based on a first standardization rule; and calculating the power-consuming device idling indicator based on the first power-consuming device quantity and the first power consumption amount; wherein the first power-consuming device quantity and the first power consumption amount correspond to a same unit of measurement.

In some embodiments, the power consumption monitoring method 200 further comprises following steps: calculating a plurality of history power-consuming device idling indicators correspond to each of a plurality of history time intervals based on a plurality of history power-consuming device quantities and a plurality of history power consumption amounts correspond to the plurality of history time intervals; and determining the warning threshold based on the plurality of history power-consuming device idling indicators.

In some embodiments, the power consumption monitoring method 200 further comprises following steps: transforming the plurality of history power-consuming device quantities and the plurality of history power consumption amounts, and generating a plurality of first history power-consuming device quantities and a plurality of first history power consumption amounts based on a second standardization rule; and calculating the plurality of history power-consuming device idling indicators based on the plurality of first history power-consuming device quantities and the plurality of first history power consumption amounts; wherein the plurality of first history power-consuming device quantities and the plurality of first history power consumption amounts correspond to a same unit of measurement.

In some embodiments, the power consumption monitoring method 200 further comprises following steps: clustering the plurality of history power-consuming device idling indicators, and generating a standard group and an abnormal group; and setting the warning threshold, as a minimum value of the abnormal group.

In some embodiments, the power consumption monitoring method 200 further comprises following steps: calculating a distribution of the plurality of history power-consuming device idling indicators in a time interval; generating an adjustment data based on the distribution of the plurality of history power-consuming device idling indicators in the time interval; and determining the warning threshold based on the adjustment data.

In some embodiments, the power consumption monitoring method 200 further comprises following steps: calculating at least one first history power-consuming device idling indicator corresponds to the adjustment time interval based on the adjustment cycle; and calculating an updated warning threshold for updating the warning threshold based on the at least one first history power-consuming device idling indicator.

In some embodiments, the power consumption monitoring method 200 further comprises following steps: clustering the plurality of history power-consuming device idling indicators, and generating at least one first warning threshold based on at least one clustering algorithm, wherein each of the at least one clustering algorithm corresponds to a weight; and determining the warning threshold based on the at least one weight and the at least one first warning threshold.

In some embodiments, the power-consuming device quantity of the power consumption monitoring method 200 is a number of test computers in an operational state.

In addition to the aforesaid steps, the second embodiment can also execute all the operations and steps of the power consumption monitoring device 100 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

According to the above descriptions, the power consumption monitoring technology (at least includes the system and the method) provided by the present disclosure obtains a power-consuming device quantity and a power consumption amount, calculates a power-consuming device idling indicator, and generates a warning message in response to the power-consuming device idling indicator exceeds a warning threshold. Therefore, when there are a certain number of idle devices draining power in a monitoring area, the power consumption monitoring technology can notice the user to check and shut the unnecessary devices down to reduce the waste of energy.

Also, the power consumption monitoring technology can calculate a history power-consuming device idling indicator based on the power-consuming device quantity and the power consumption amount obtained in the past, and calculate the warning threshold based on the history power-consuming device idling indicator.

In addition, the power consumption monitoring technology can calculate a distribution of a plurality of history power-consuming device idling indicators in a time interval, generate an adjustment data, and calculate the warning threshold based on the adjustment data. In order to generate a warning threshold with higher precision by using periodic features of the distribution of the plurality of history power-consuming device idling indicators.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A power consumption monitoring device, comprising:
   a sensor, configured to detect a electric-consuming device quantity and a power consumption amount;
   a storage, configured to store the electric-consuming device quantity and the power consumption amount; and
   a processor, communicatively connected to the sensor and the storage, wherein the processor is configured to:
   calculating, a electric-consuming device idling indicator, based on the electric-consuming device quantity and the power consumption amount in a monitoring time interval, wherein the electric-consuming device idling indicator is used for indicating a deviation status of the electric-consuming device quantity and the power consumption amount;
   determining, whether the electric-consuming device idling indicator exceeds a warning threshold; and
   generating, in response to the electric-consuming device idling indicator exceeding the warning threshold, a warning message;
   wherein the processor is further configured to:
   transforming, the electric-consuming device quantity and the power consumption amount, and generating a first electric-consuming device quantity and a first power consumption amount, based on a first standardization rule, wherein the first electric-consuming device quantity and the first power consumption amount correspond to a same unit of measurement; and
   calculating, the electric-consuming device idling indicator, based on the first electric-consuming device quantity and the first power consumption amount.

2. The power consumption monitoring device of claim 1, wherein the processor is further configured to:
   calculating, a plurality of history electric-consuming device idling indicators correspond to each of a plurality of history time intervals, based on a plurality of history electric-consuming device quantities and a plurality of history power consumption amounts correspond to the plurality of history time intervals; and
   determining, the warning threshold, based on the plurality of history electric-consuming device idling indicators.

3. The power consumption monitoring device of claim 2, wherein the processor is further configured to:
   transforming, the plurality of history electric-consuming device quantities and the plurality of history power consumption amounts, and generating a plurality of first history electric-consuming device quantities and a plurality of first history power consumption amounts, based on a second standardization rule; and
   calculating, the plurality of history electric-consuming device idling indicators, based on the plurality of first history electric-consuming device quantities and the plurality of first history power consumption amounts;
   wherein the plurality of first history electric-consuming device quantities and the plurality of first history power consumption amounts correspond to a same unit of measurement.

4. The power consumption monitoring device of claim 2, wherein the processor is further configured to:
   clustering, the plurality of history electric-consuming device idling indicators, and generating a standard group and an abnormal group; and
   setting, the warning threshold, as a minimum value of the abnormal group.

5. The power consumption monitoring device of claim 2, wherein the processor is further configured to:
   calculating, a distribution of the plurality of history electric-consuming device idling indicators in a time interval;
   generating, an adjustment data, based on the distribution of the plurality of history electric-consuming device idling indicators in the time interval; and
   determining, the warning threshold, based on the adjustment data.

6. The power consumption monitoring device of claim 5, wherein the adjustment data includes an adjustment time interval and an adjustment cycle, and the processor is further configured to:
   calculating, at least one first history electric-consuming device idling indicator corresponds to the adjustment time interval, based on the adjustment cycle; and
   calculating, an updated warning threshold for updating the warning threshold, based on the at least one first history electric-consuming device idling indicator.

7. The power consumption monitoring device of claim 2, wherein the processor is further configured to:
   clustering, the plurality of history electric-consuming device idling indicators, and generating at least one first warning threshold, based on at least one clustering algorithm, wherein each of the at least one clustering algorithm corresponds to a weight; and
   determining, the warning threshold, based on the at least one weight and the at least one first warning threshold.

8. The power consumption monitoring device of claim 1, wherein the electric-consuming device quantity is a number of test computers in an operational state.

9. A power consumption monitoring method, suitable for an electronic device, the power consumption monitoring method comprising:
- detecting, a electric-consuming device quantity and a power consumption amount;
- calculating, a electric-consuming device idling indicator, based on the electric-consuming device quantity and the power consumption amount in a monitoring time interval, wherein the electric-consuming device idling indicator is used for indicating a deviation status of the electric-consuming device quantity and the power consumption amount;
- determining, whether the electric-consuming device idling indicator exceeds a warning threshold; and
- generating, in response to the electric-consuming device idling indicator exceeding the warning threshold, a warning message;
- wherein the power consumption monitoring method further comprises:
- transforming, the electric-consuming device quantity and the power consumption amount, and generating a first electric-consuming device quantity and a first power consumption amount, based on a first standardization rule, wherein the first electric-consuming device quantity and the first power consumption amount correspond to a same unit of measurement; and
- calculating, the electric-consuming device idling indicator, based on the first electric-consuming device quantity and the first power consumption amount.

* * * * *